(12) United States Patent
Hutchins et al.

(10) Patent No.: US 7,271,971 B2
(45) Date of Patent: Sep. 18, 2007

(54) DYNAMICALLY ADAPTING A MAGNETIC TAPE READ CHANNEL EQUALIZER

(75) Inventors: Robert Allen Hutchins, Tucson, AZ (US); Glen Alan Jaquette, Tucson, AZ (US); Evangelos S. Eleftheriou, Zurich (CH); Sedat Oelcer, Kilchberg (CH)

(73) Assignee: International Business Machines Corporation, Armonk, NY (US)

( * ) Notice: Subject to any disclaimer, the term of this patent is extended or adjusted under 35 U.S.C. 154(b) by 384 days.

(21) Appl. No.: 11/003,283

(22) Filed: Dec. 3, 2004

(65) Prior Publication Data

US 2006/0119969 A1    Jun. 8, 2006

(51) Int. Cl.
    *G11B 5/035*    (2006.01)
(52) U.S. Cl. .................. 360/65; 360/77.12; 360/67; 360/68; 360/51; 360/39
(58) Field of Classification Search .............. None
    See application file for complete search history.

(56) References Cited

U.S. PATENT DOCUMENTS

| | | | |
|---|---|---|---|
| 5,132,988 A * | 7/1992 | Fisher et al. ............... 375/233 |
| 5,243,624 A | 9/1993 | Paik et al. .................... 375/14 |
| 5,422,760 A | 6/1995 | Abbott et al. ................. 360/46 |
| 5,450,253 A * | 9/1995 | Seki et al. ..................... 360/65 |
| 5,576,983 A | 11/1996 | Shiokawa ................... 364/754 |
| 5,740,206 A | 4/1998 | Lomp et al. ................ 375/346 |
| 5,852,524 A * | 12/1998 | Glover et al. ................. 360/51 |
| 5,872,728 A | 2/1999 | Richter .................... 364/724.2 |
| 5,999,355 A | 12/1999 | Behrens et al. .............. 360/65 |
| 6,078,614 A * | 6/2000 | Brown et al. ............... 375/232 |
| 6,201,832 B1 * | 3/2001 | Choi .......................... 375/233 |
| 6,208,481 B1 | 3/2001 | Spurbeck et al. ............. 360/65 |
| 6,222,876 B1 | 4/2001 | Hirth et al. ................. 375/224 |
| 6,282,042 B1 * | 8/2001 | Hana et al. ................... 360/64 |
| 6,307,900 B1 * | 10/2001 | Choi .......................... 375/341 |

(Continued)

FOREIGN PATENT DOCUMENTS

EP    0805447    11/1997

(Continued)

OTHER PUBLICATIONS

Shahid U. H. Qureshi, Adaptive Equalization, Proceedings of the IEEE, vol. 73, No. 9, Sep. 1985, pp. 1349-1387.

*Primary Examiner*—Andrea Wellington
*Assistant Examiner*—Dismery Mercedes
(74) *Attorney, Agent, or Firm*—John H. Holcombe

(57) ABSTRACT

A read channel equalizer of a magnetic tape drive which equalizes digitally sampled magnetic signals detected by a read head is dynamically adapted. A detector of equalizer dynamic adaptation logic compares equalizer output signals to desired values that are based on the decoding scheme (such as +2, 0 and −2 for PR4) to sense equalizer output signals that are offset from at least one desired value, and signals the fact of each offset and its polarity as amplitude independent error signals. The signaled sensed amplitude independent error signals are fed back to adjustable taps of the equalizer. The simplified error signals thus avoid complex calculations of waveform errors, such as least mean square calculations. The error signals may be weighted and may be adjusted to align synchronously provided error signals with asynchronous taps of the equalizer.

18 Claims, 11 Drawing Sheets

U.S. PATENT DOCUMENTS

| | | | |
|---|---|---|---|
| 6,385,239 B1 * | 5/2002 | Okamoto et al. | 375/232 |
| 6,424,686 B1 * | 7/2002 | Hutchins et al. | 375/341 |
| 6,430,287 B1 | 8/2002 | Rao | 379/406.08 |
| 6,546,063 B1 | 4/2003 | Lee et al. | 375/346 |
| 6,614,841 B1 * | 9/2003 | Ohta | 375/232 |
| 6,934,233 B2 * | 8/2005 | Miyashita et al. | 369/53.16 |
| 2004/0190649 A1 * | 9/2004 | Endres et al. | 375/326 |
| 2005/0117243 A1 * | 6/2005 | Serizawa | 360/65 |

FOREIGN PATENT DOCUMENTS

| | | |
|---|---|---|
| JP | 10064192 | 6/1999 |

* cited by examiner

| | PR4 | EPR4 |
|---|---|---|
| PLEV2x | +2 | +2 |
| PLEV1x | +2 | +1 |
| NLEV1x | -2 | -1 |
| NLEV2x | -2 | -2 |
| PSLICE2x | +1 | +1.5 |
| PSLICE1x | +1 | +0.5 |
| NSLICE1x | -1 | -0.5 |
| NSLICE2x | -1 | -1.5 |

DYNAMICALLY ADAPTING A MAGNETIC TAPE READ CHANNEL EQUALIZER

FIELD OF THE INVENTION

This invention relates to magnetic tape drives, and, more particularly, to the equalization function of magnetic tape read channels.

BACKGROUND OF THE INVENTION

Magnetic tape cartridges provide a means to store data on magnetic tape to be saved and read back at a subsequent time. A magnetic tape drive writes the data to magnetic tape, typically as a set of parallel tracks, and subsequently a magnetic tape drive reads back the data. To read back the data, a magnetic tape drive typically comprises parallel read heads to read each of the parallel tracks, a drive system for moving a magnetic tape with respect to the read heads such that the read heads may detect magnetic signals on the magnetic tape, and a read channel for digitally sampling magnetic signals detected by the read heads and for providing digital samples of the magnetic signals. The digital samples are then decoded into data bits, and the data bits from the parallel tracks are combined to provide the read back data. The read channel typically requires an equalizer for each of the read heads to compensate for the change in the signal due to the magnetic recording properties of the write head, the magnetic tape, and the read head. Magnetic tapes may be interchanged between tape drives, such that a magnetic tape written on one tape drive will be read by another tape drive. Variation in the response of the read heads to the variously written magnetic tapes may result in unacceptably poor read back of the recorded signals.

Adaptive equalizers have been implemented in magnetic tape drives, and have been based on solving a set of equations to find the equalizer characteristic that reduces the error between the desired and actual amplitudes. The set of equations may be highly complex and require some amount of time to calculate. Thus, the equalizer might be computed at the beginning of use with respect to a magnetic tape, or recomputed a few times during use. Further, the desired amplitudes may be difficult to estimate. Hence, in many instances, the desired amplitudes are best estimated by employing a signal having known characteristics, such as a synchronization signal, or a data set separator signal, and not the random data signals.

In magnetic tape, the recording characteristics may not only vary from track to track, but may as well vary in a continuous fashion along a track or tracks. Thus, a selected equalizer characteristic, although satisfactory at the beginning or at some specific track location of a magnetic tape, may lead to an increase in data read errors at some point along the track.

Further, in magnetic tape, an equalizer typically equalizes signals in the asynchronous domain, which means that the digital samples that are processed by the equalizer are taken asynchronously with respect to the clock that is used to write the data on the magnetic tape. This makes a determination of a desired amplitude at the point of the asynchronous sample a difficult task.

SUMMARY OF THE INVENTION

Magnetic tape drives, read channels, and logic are provided for dynamically adapting an equalizer of a magnetic tape read channel. Data signals may be employed to provide the dynamic adaptation.

A magnetic tape drive comprises at least one read head, a drive system for moving a magnetic tape with respect to the read head(s) such that the read head(s) may detect magnetic signals on the magnetic tape, and a read channel for digitally sampling magnetic signals detected by the read head(s), providing digital samples of the magnetic signals.

The read channel comprises at least a dynamically adaptive read channel equalizer having at least one adjustable tap, the equalizer equalizing input read signals, and providing output signals.

In one embodiment, the equalizer dynamic adaptation logic comprises a detector sensing those equalizer output signals that are offset from at least one desired value, and signaling the sensed offset equalizer output signals as amplitude independent error signals; and feedback logic to feed back the signaled sensed amplitude independent error signals to at least one adjustable tap of the equalizer. The amplitude independent error signals represent the fact of the offset.

In one embodiment, the detector of the adaptive logic senses the polarities of the offset equalizer output signals from the desired value(s), and provides signals of the sensed offset equalizer output as amplitude independent error signals indicating the polarity of the offset.

In one embodiment, the desired value(s) comprises value(s) based on the decoding scheme for the recorded magnetic signals.

In one embodiment, the feedback logic of the adaptive logic additionally weights the amplitude independent error signals.

In a further embodiment, wherein the equalizer operates in an asynchronous domain having a first sample rate, and the equalizer comprises a plurality of taps arranged in accordance with the first sample rate; the detector operates in a synchronous domain having a second sample rate less than the first sample rate, to sense those equalizer output signals that are offset from at least one synchronous desired value, and to signal the sensed offset equalizer output signals as amplitude independent errors; and the feedback logic adjusts the feed back to the plurality of taps to match the alignment of the synchronous error signals to the taps of the equalizer.

In a still further embodiment, the feedback logic adjusts the feedback to the plurality of taps to match the alignment of the synchronous error signals to the taps of the equalizer by signaling selected ones of the plurality of taps of the equalizer.

In another still further embodiment, the feedback logic comprises an interpolator to convert the amplitude independent errors to the alignment of the adjustable taps of the equalizer.

In one embodiment, the feedback logic of the adaptive logic additionally comprises a damping apparatus for damping the effect of the amplitude independent error signals to the adjustable tap(s) of the equalizer.

In a further embodiment, the feedback logic damping apparatus comprises an accumulator, wherein overflow and/or underflow from the accumulator is supplied to the adjustable tap(s) of the equalizer.

In a further embodiment, the feedback logic damping apparatus comprises at least one threshold of the amplitude independent error signals.

In one embodiment, wherein the equalizer comprises a plurality of taps, the feedback logic of the adaptive logic is arranged to adjust each of the plurality of taps simultaneously.

In one embodiment, the equalizer additionally comprises logic to reset the tap(s) to nominal value.

In one embodiment, the equalizer additionally comprises logic to block feed back of the signaled sensed amplitude independent error signals to prevent adjustment of the tap(s).

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
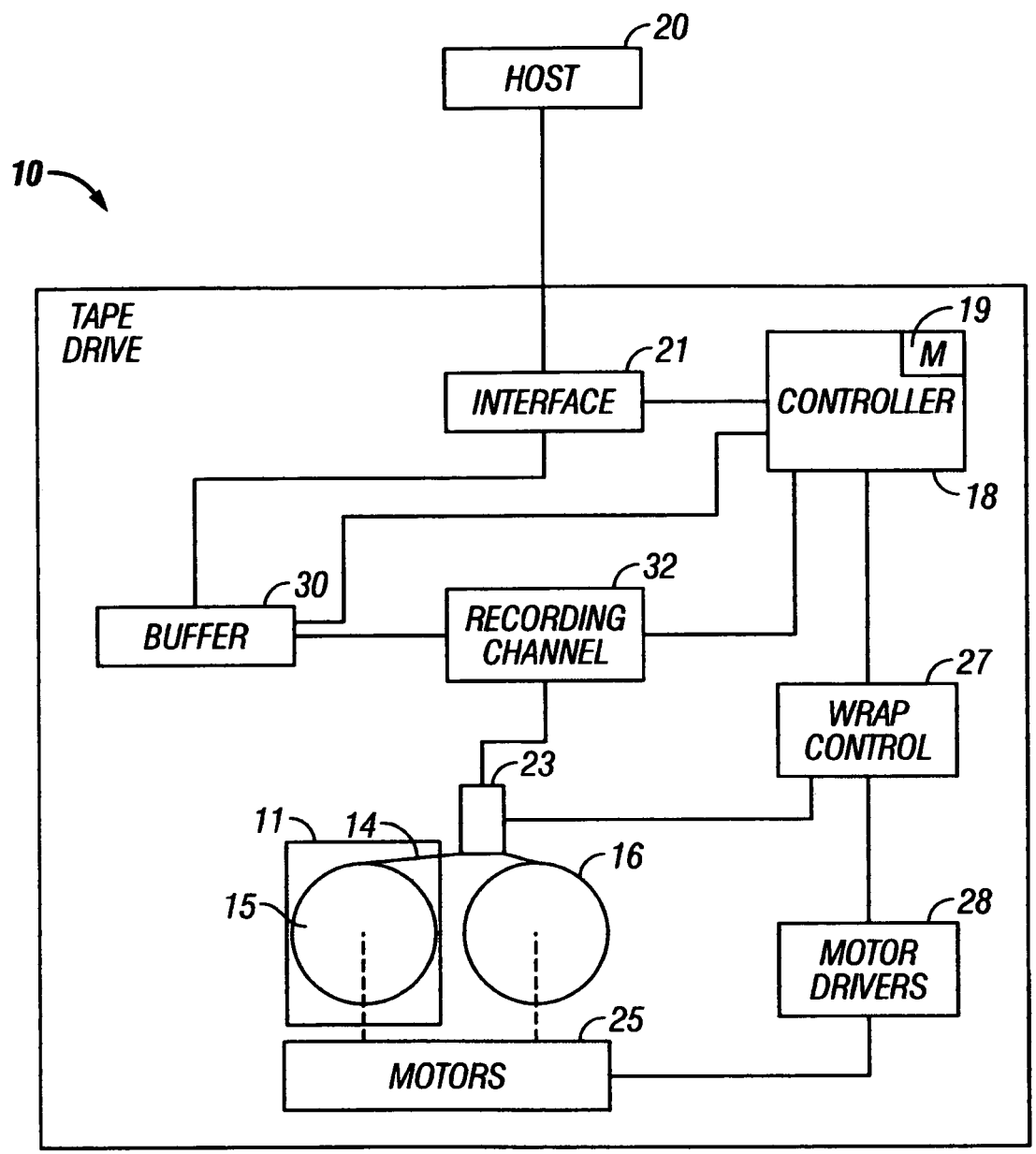
FIG. 1 is a block diagram of a magnetic tape drive which may implement the present invention.

Referring to FIG. 1, a magnetic tape drive 10 is illustrated which may implement aspects of the present invention. The magnetic tape drive provides a means for reading and writing information with respect to a magnetic tape 14 of a magnetic tape cartridge 11.

Magnetic tape cartridges provide a means to store data on magnetic tape to be saved and read at a subsequent time. Further, the magnetic tape cartridges may be interchanged between tape drives, such that a magnetic tape written on one tape drive will be read by another tape drive.

As is understood by those of skill in the art, a magnetic tape cartridge 11 comprises a length of magnetic tape 14 wound on one or two reels 15, 16.

A single reel magnetic tape cartridge 11 is illustrated, examples of which are those adhering to the Linear Tape Open (LTO) format. An example of a magnetic tape drive 10 is the IBM 3580 Ultrium magnetic tape drive based on LTO technology. A further example of a single reel magnetic tape drive and associated cartridge is the IBM 3592 TotalStorage Enterprise magnetic tape drive and associated magnetic tape cartridge. An example of a dual reel cartridge is the IBM 3570 magnetic tape cartridge and associated drive.

Also as is understood by those of skill in the art, a magnetic tape drive 10 comprises one or more controllers 18 of a recording system for operating the magnetic tape drive in accordance with commands received from a host system 20 received at an interface 21. A controller typically comprises logic and/or one or more microprocessors with a memory 19 for storing information and program information for operating the microprocessor(s). The program information may be supplied to the memory via the interface 21, by an input to the controller 18 such as a floppy or optical disk, or by read from a magnetic tape cartridge, or by any other suitable means. The magnetic tape drive 10 may comprise a standalone unit or comprise a part of a tape library or other subsystem. The magnetic tape drive 10 may be coupled to the host system 20 directly, through a library, or over a network, and employ at interface 21 a Small Computer Systems Interface (SCSI), an optical fiber channel interface, etc.

The magnetic tape cartridge 11 may be inserted in the magnetic tape drive 10, and loaded by the magnetic tape drive so that one or more read and/or write heads 23 of the recording system reads and/or writes information in the form of signals with respect to the magnetic tape 14 as the tape is moved longitudinally by one or more motors 25 which rotate the reels 15, 16. The magnetic tape typically comprises a plurality of parallel tracks, or groups of tracks. In some formats, such as the LTO format, above, the tracks are arranged in a serpentine back and forth pattern of separate wraps, as is known to those of skill in the art. Also as known to those of skill in the art, the recording system may comprise a wrap control system 27 to electronically switch to another set of read and/or write heads, and/or to seek and move the read and/or write heads 23 laterally of the magnetic tape, to position the heads at a desired wrap or wraps, and, in some embodiments, to track follow the desired wrap or wraps. The wrap control system may also control the operation of the motors 25 through motor drivers 28, both in response to instructions by the controller 18.

Controller 18 also provides the data flow and formatter for data to be read from and written to the magnetic tape, employing a buffer 30 and a recording channel 32, as is known to those of skill in the art.

The drive system comprising at least motors 25 and reels 15, 16 moves a magnetic tape 14 with respect to the read head(s) 23 such that the read head(s) may detect magnetic signals on the magnetic tape, and a read channel of the recording channel 32 digitally samples the magnetic signals detected by the read head(s), providing digital samples of the magnetic signals.

Figure 2:
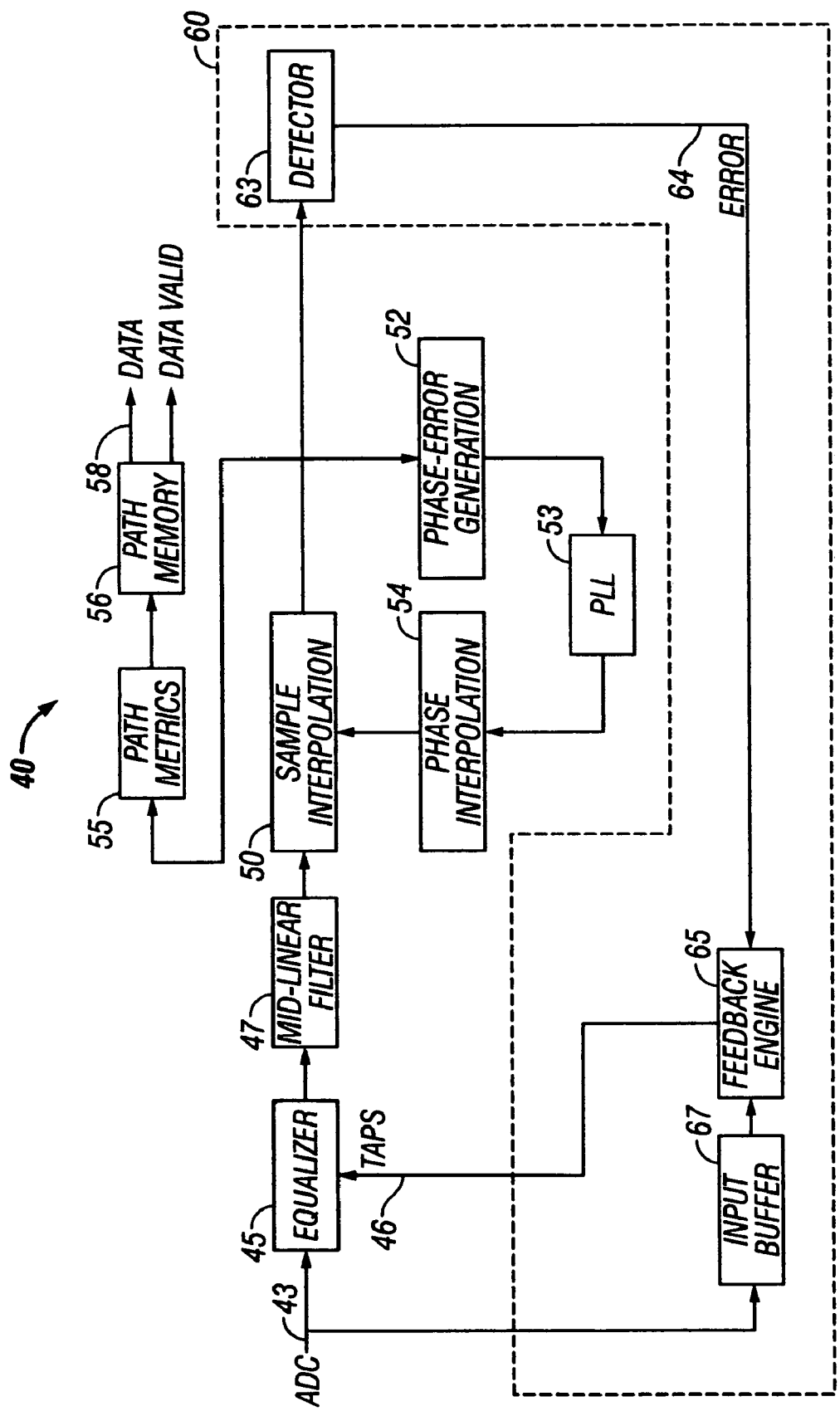
FIG. 2 is a block diagram of a read channel of the magnetic tape drive of FIG. 1 with a dynamically adaptive equalizer in accordance with the present invention.

FIG. 2 illustrates an embodiment of a portion of a read channel 40 of the recording channel 32 of FIG. 1 with a dynamically adaptive equalizer in accordance with the present invention. In the example of a plurality of parallel tracks, which are read simultaneously, the recording channel 32 may comprise a similar plurality of the read channels 40, in which some of the components may be shared.

Referring to FIG. 2, for clarity some elements of a typical read channel are omitted, such as an analog to digital converter (ADC), to provide digital samples of the magnetic signals detected by the read head. The digital samples are provided at ADC output to an input 43 of an equalizer 45 having adjustable taps. An embodiment of a digital sample equalizer 45 typically comprises a finite impulse response (FIR) filter. The equalizer 45 modifies the digital samples to compensate for the change in the signal due to the magnetic recording properties of the write head, the magnetic tape, and the read head. The modification is based on a series of specific functions, which may be adapted by changing the control settings of at least one tap 46 of the equalizer. The modified digital samples output by the equalizer 45 are typically supplied to a mid-linear filter 47 which determines signal sample values at mid-sampling time instants, and supplied to a sample interpolator 50.

Determination of the information content of the magnetic signals requires determining the timing or position of magnetic transitions of the magnetic signals. Typically, the samples at the equalizer input 43 are taken asynchronously with respect to the clock used to write the data on the magnetic tape. A sample interpolator 50 interpolates the asynchronous samples into a set of samples that can be considered to be in synchronism with the write clock or with the positions of the magnetic recording transitions. The sample interpolator output is typically employed by phase-error generation logic 52, a phase locked loop (PLL) 53 and phase interpolation logic 54 to derive a clock for the sample interpolation 50 to provide the synchronous samples. A gain element may be optionally provided at the output of the sample interpolation 50.

The synchronous digital samples output from the sample interpolation 50 are then employed to determine the data information represented by the digital samples. In one example, a partial response data detector comprises path metrics 55 and a path memory 56 to determine and decode the data information and provide the data information on output 58. As is understood by those of skill in the art, one partial response decoding scheme is called PR4, and another is called EPR4. Those of skill in the art understand that many alternative digital decoding arrangements may be employed.

The equalizer 45, filter 47, and sample interpolation logic 50 typically operate in the asynchronous domain, and the data detector 55, 56 typically operate in the synchronous domain. In other embodiments, the clocking of the detected magnetic signals is controlled so that the equalizer 45, filter 47, and sample interpolation logic 50 are all in a synchronous domain. The present invention is suitable for both the synchronous domain, and the asynchronous and synchronous domain combination, as will be discussed.

Dynamic adaptation logic 60 in accordance with an embodiment of the present invention comprises a detector 63 sensing those sample interpolator output signals (for convenience, herein also referred to as equalizer output signals), and signaling the sensed deviation or offset of the equalizer output signals from at least one desired value as amplitude independent error signals 64; and a feedback engine 65 to feed back the signaled sensed amplitude independent error signals to at least one adjustable tap of the equalizer. The dynamic adaptation logic 60 may comprise any suitable logic as known or becomes known to those of skill in the art. Examples include discrete logic, ASIC (application specific integrated circuit), FPGA (field programmable gate array), and custom processors.

The amplitude independent error signals may be considered as signals of the fact of each offset, and do not reflect the amount of the offset. Further, the polarity of each signaled offset may be part of the amplitude independent error signals.

In one embodiment of the present invention, an input buffer 67 supplies the input digital samples to the feedback engine, as will be discussed.

In accordance with the present invention, detector 63 compares equalizer output signals to desired values, and, if they are not the same, i.e. there is an offset, signals an error. The error signal does not identify the amplitude of the error, but rather signals the fact of an error. In this manner, the error signals are termed herein as "amplitude independent error signals".

In one embodiment, the detector of the adaptive logic senses the polarities of the offset of the equalizer output signals from the desired value(s), and provides signals of the sensed offset equalizer output as amplitude independent error signals indicating the polarity of the offset.

Thus, the amplitude independent error signals indicate not only that there was an error, but also the direction of the error. The simplified error signals allow the adaptation of the equalizer to be dynamic, and allow data signals to be employed to provide the dynamic adaptation.

The comparison of the detector 63 between the desired values and the equalizer output signals may be conducted in various ways, for example, comprising a direct comparison. In one embodiment, the desired value(s) comprises value(s) based on the decoding scheme for the recorded magnetic signals. For example, desired values of digital samples for a PR4 decoding scheme may comprise values of "+2", "0" and "−2". Thus, detector 63 compares a digital sample of the equalizer output to the one of the desired values that is closest, and indicates whether there is an error.

Figures 3, 4:
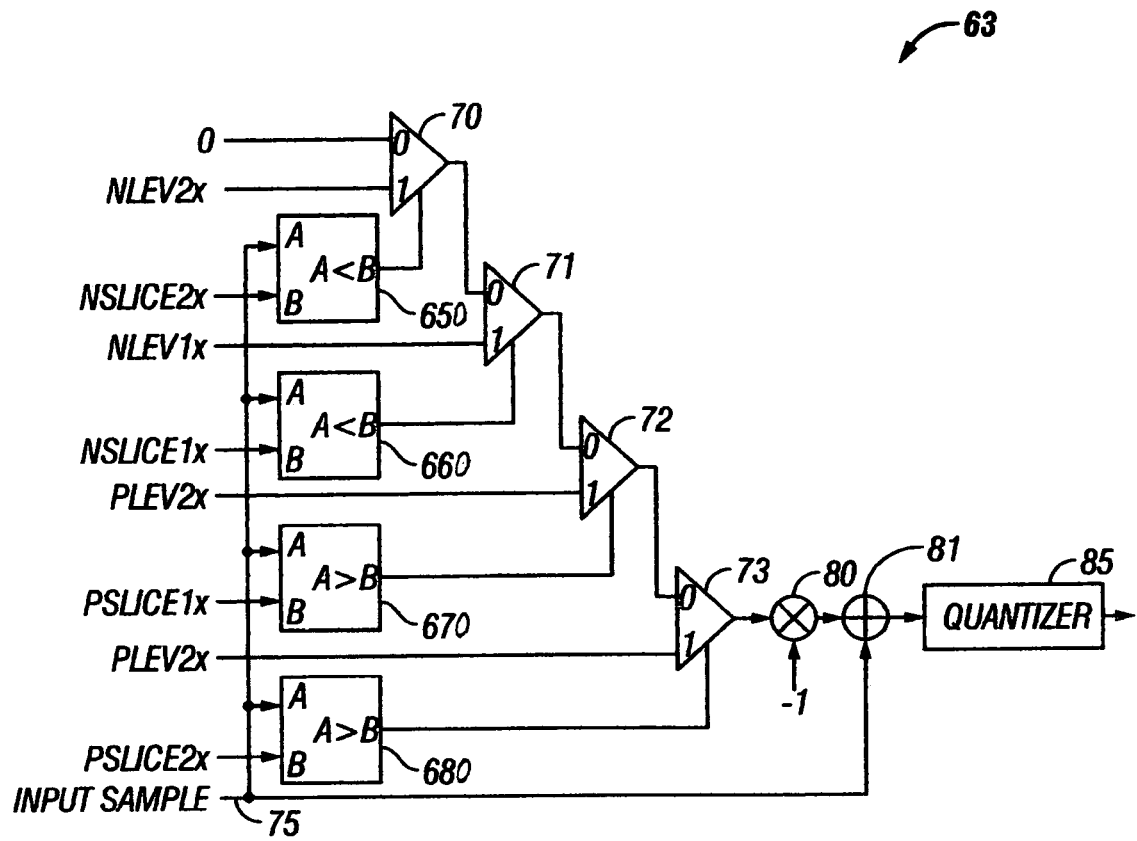
FIG. 3 is a block diagram of a detector of the read channel of FIG. 2 for sensing equalizer output signals that are offset from the desired value, and signaling the sensed offset equalizer output signals as amplitude independent error signals.
FIG. 4 is a table representing the respective signal operation of an embodiment of the detector of FIG. 3.

An embodiment of the detector 63 that provides a comparison of the equalizer output to the one of the desired values that is closest, comprises a slicer illustrated in FIG. 3, and FIG. 4 is a table 640 representing the respective signal operation of the detector of FIG. 3.

Figure 5:
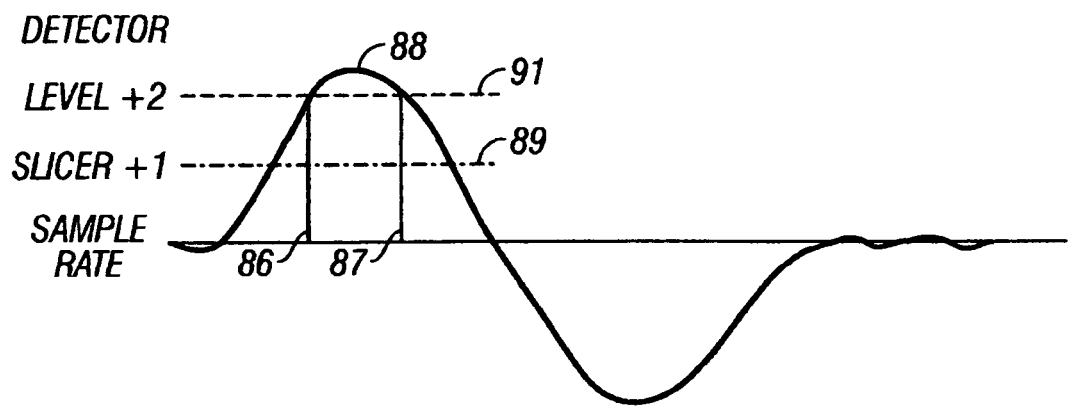
FIG. 5 is a diagrammatic illustration of imaginary equalizer output signals and showing an example of operation of the FIG. 4 embodiment of the detector of FIG. 3.

Referring to FIGS. 3 and 4, the slicing of the amplitude levels to determine the closest desired values is accomplished by comparators 650, 660, 670 and 680 in conjunction with gates 70, 71, 72 and 73. The slicer of FIG. 3 is switchable between PR4 and EPR4, and therefore the sets of comparators and gates are double the requirement for PR4 in which the desired values are "+2", "0" or "−2", in order to accommodate EPR4 in which the desired values are "+2", "+1", "0", "−1" or "−2". Referring to table 640, for PR4 comparators 650 and 660, and gates 70 and 71 are set to separate input samples 75 that are greater than "+1", and both comparators 670 and 680, and gates 72 and 73 are set to separate input samples that are less than "−1". In the embodiment, digital samples that are greater than "+1" are thus close to the desired value (positive level "PLEV") of "+2", which desired value is gated by gates 70 and 71; digital samples that are less than "−1" are close to the desired value (negative level "NLEV") of "−2", which desired value is gated by gates 72 and 73; and those that are less than "+1" and greater than "−1" are close to the desired value of "0", which desired value is the alternative value gated by gates 70, 71, 72 and 73. FIG. 5 illustrates examples of the operation of the slicer for two input samples 86, 87 of an imaginary analog waveform 88 for PR4. The slicer setting 89 of "+1" separates both samples as closest to the desired value 91 of "+2". Per the example, input sample 86 is negatively offset from the desired value, and input sample 87 is positively offset from the desired value.

Figure 6:
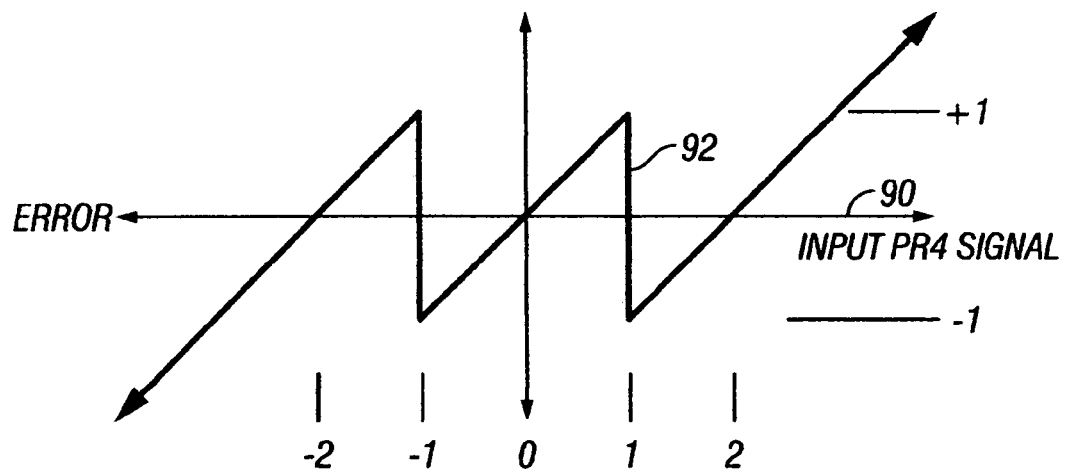
FIG. 6 is a diagrammatic illustration of the input and output before quantization of the FIG. 4 embodiment of the detector of FIG. 3 for a PR4 detection scheme.

An illustration of the input and output of the slicer for a PR4 detection scheme is illustrated by FIG. 6, in which the input PR4 signal amplitudes 90 are represented as continuously varying values in the horizontal axis, and the error amplitudes 92 are represented by the vertical axis.

In the embodiment of FIGS. 3 and 4, the gated closest desired value is compared to the input sample 75 by inverting 80 the gated closest desired value and summing 81 the input sample with the inverted input sample. The result is a signed amplitude of the offset between the desired value and the input sample, which offset is quantized 85 to an amplitude independent error signal indicating the polarity of the offset.

Figure 7:
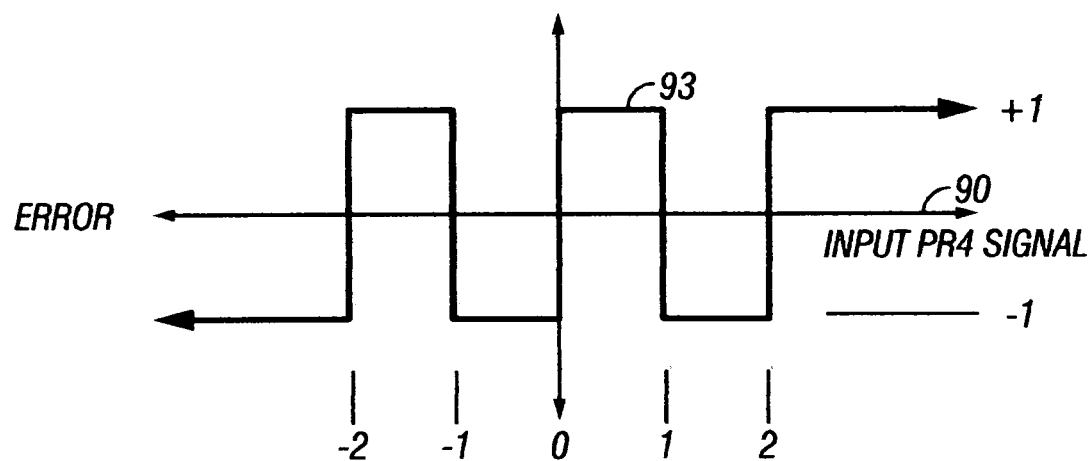
FIG. 7 is a diagrammatic illustration of the input and amplitude independent output of the FIG. 4 embodiment of the detector of FIG. 3 for a PR4 detection scheme.

An illustration of the input and output of the detector 63 for a PR4 detection scheme is illustrated by FIG. 7, in which the input PR4 signal amplitudes 90 are represented as continuously varying values in the horizontal axis, and the amplitude independent error signals 93 are represented by the vertical axis.

Still referring to FIG. 3 and the table 640 of FIG. 4, for EPR4, comparator 650 and gate 70 are set to separate input samples 75 that are greater than "+1.5", comparator 660 and gate 71 are set to separate input samples 75 that are greater than "+0.5", comparator 670 and gate 72 are set to separate input samples 75 that are less than "−0.5", and comparator 680 and gate 73 are set to separate input samples that are less than "−1.5". In the embodiment, digital samples that are greater than "+1.5" are thus close to the desired value (positive level "PLEV") of "+2", which desired value is gated by gate 70; digital samples that are less than "+1.5" and greater than "+0.5" are thus close to the desired value (positive level "PLEV") of "+1", which desired value is gated by gate 71; digital samples that are less than "−1.5" are close to the desired value (negative level "NLEV") of "−2", which desired value is gated by gate 73; digital samples that are less than "−0.5" and greater than "−1.5" are close to the desired value (negative level "NLEV") of "−1", which desired value is gated by gate 72; and those that are less than "+0.5" and greater than "−0.5" are close to the desired value of "0", which desired value is the alternative value gated by gates 70, 71, 72 and 73.

In the embodiment, the gated closest desired value is compared to the input sample 75 by inverting 80 the gated closest desired value and summing 81 the input sample with the inverted input sample. The result is a signed amplitude of the offset between the desired value and the input sample, which offset is quantized 85 to an amplitude independent error signal indicating the polarity of the offset.

Figure 8:
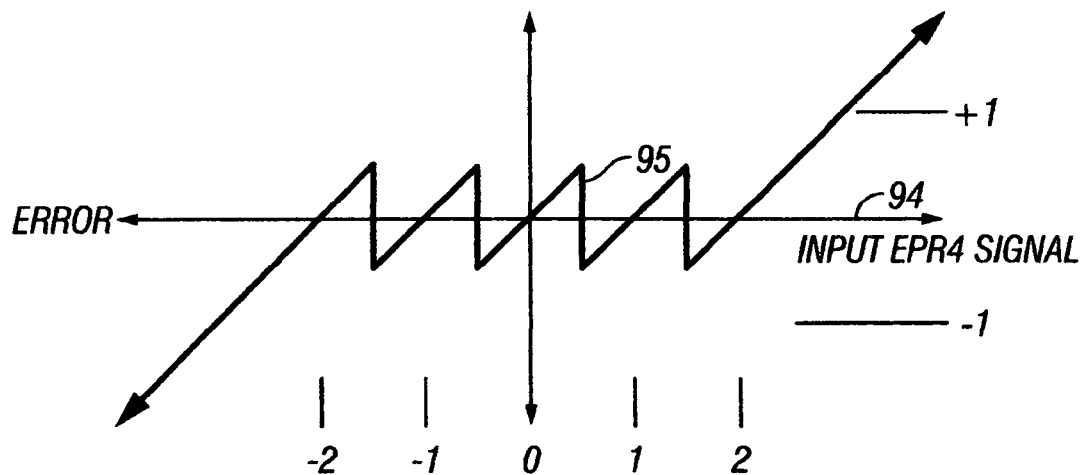
FIG. 8 is a diagrammatic illustration of the input and output before quantization of the FIG. 4 embodiment of the detector of FIG. 3 for an EPR4 detection scheme.

An illustration of the input and output of the slicer for an EPR4 detection scheme is illustrated by FIG. 8, in which the input EPR4 signal amplitudes 94 are represented as continuously varying values in the horizontal axis, and the error amplitudes 95 are represented by the vertical axis.

Figure 9:
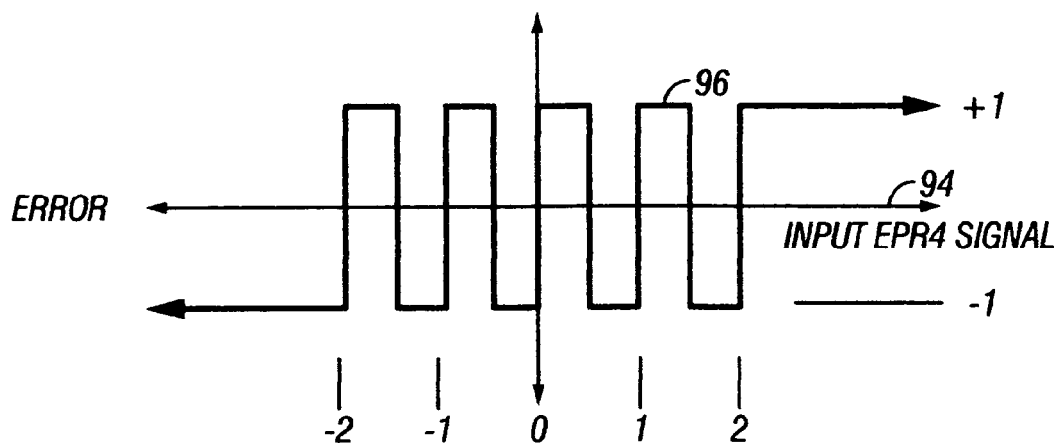
FIG. 9 is a diagrammatic illustration of the input and amplitude independent output of the FIG. 4 embodiment of the detector of FIG. 3 for an EPR4 detection scheme.

An illustration of the input and output of the detector 63 for an EPR4 detection scheme is illustrated by FIG. 9, in which the input EPR4 signal amplitudes 94 are represented as continuously varying values in the horizontal axis, and the amplitude independent error signals 96 are represented by the vertical axis.

Another embodiment of the detector 63 comprises logic to determine the offset between the input sample and each of the desired values and then to determine the smallest offset and provide an amplitude independent error signal representing the sign of the smallest offset.

Figure 10:
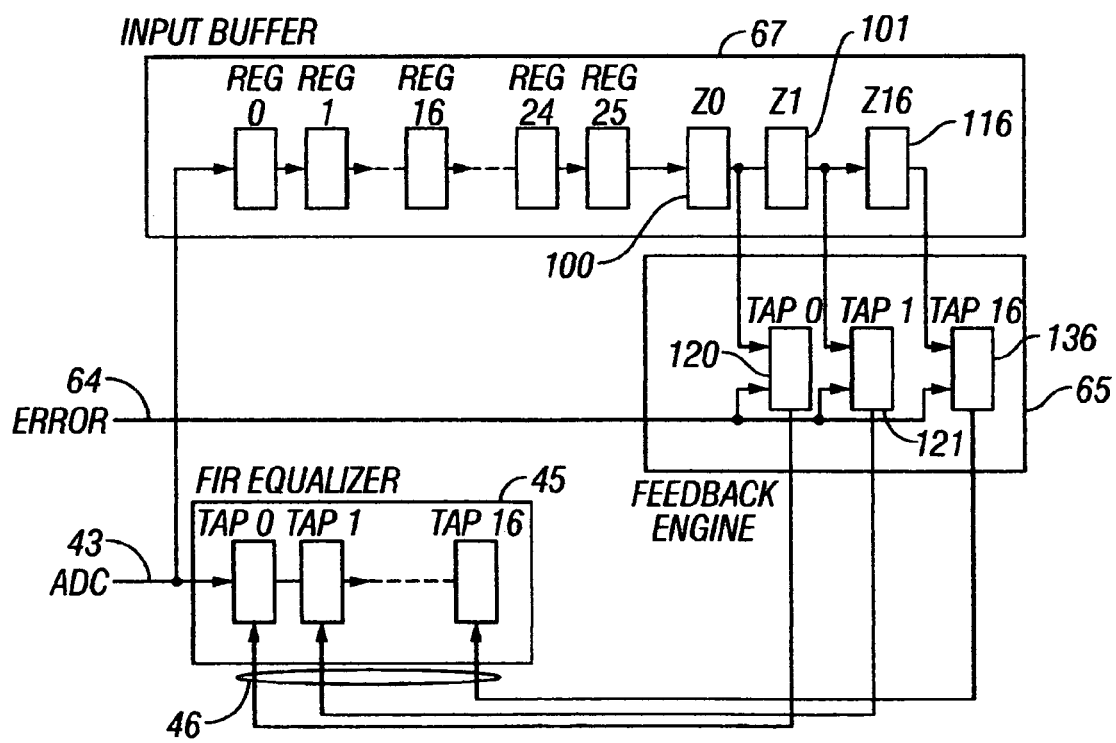
FIG. 10 is a block diagram of feedback logic to feed back the signaled sensed amplitude independent error signals of the detector of FIG. 3 to adjustable taps of the equalizer of FIG. 2.

FIG. 10 is a block diagram of feedback engine 65, comprising logic to feed back the signaled sensed amplitude independent error signals 64 of the detector 63 of FIG. 3 to adjustable taps 46 of the equalizer of FIG. 2. In one embodiment, the feedback engine 65 of the adaptive logic 60 additionally weights the amplitude independent error signals. Alternatively, the amplitude independent error signals are fed back by the feedback engine 65 directly to the adjustable taps of the equalizer 45.

Referring to FIG. 10, input buffer 67, in one embodiment for weighting the error signals, comprises a series of registers to delay the input samples 43 by an amount to compensate for the delay in the operation of the equalizer 45, filter 47, interpolator 50, any gain element, and detector 63 of FIG. 2, so that the error signals to the taps 46 of the equalizer 45 are aligned with the samples of the ADC 43 that resulted in the error signals.

Figure 11:
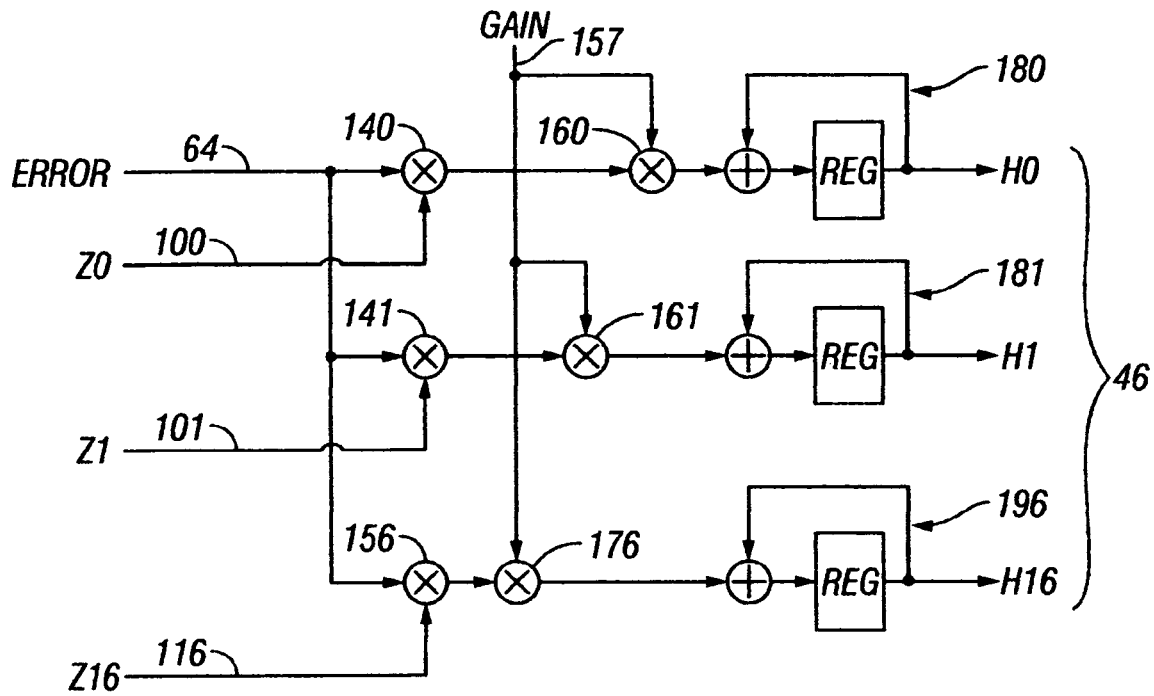
FIG. 11 is a block diagram of logic to weight the feed back error signals of the feedback logic of FIG. 10.

Referring to FIGS. 10 and 11, the weighting in the illustrated embodiment comprises a weighting related to the amplitude of the sample that resulted in the error signal.

In FIG. 10, the weighting comprises a direct scaling of the error signal to the amplitude of the sample that resulted in the error signal. In the example, there are 17 samples to correspond to 17 taps of the FIR equalizer. The registers of buffer 67 provide the input samples from registers 100, 101 . . . 116 to registers 120, 121 . . . 136 of the feedback engine 65, and the amplitude independent error signals provide the fact of an error and provide the sign of that error, so that the output of the feedback logic comprises error signals having the sign of the amplitude independent error signals which are directly scaled to the input samples. An alternative weighting is to weight the amplitude independent error signals by the percentage of the error to the value of the desired signal. For example, in EPR4, an error to a +1 desired sample value is twice the percentage of the same error to a +2 sample.

FIG. 11 represents an alternative embodiment of the feedback engine 65 of FIG. 10, in which a gain 157 is also applied to the fed back error signals. The amplitude independent error signals 64 are first scaled to the input samples from registers 100, 101 . . . 116 of FIG. 10 by logic 140, 141 . . . 156, and then multiplied by the gain 157 by logic 160, 161 . . . 176, and then applied to accumulators 180, 181 . . . 196 of the feedback engine 65 to be supplied as error signals to the taps 46 of the equalizer 45. The functions of the accumulators will be discussed herein after. Alternatively, the weighted error signals may be applied directly to the taps 46 of the equalizer.

As is known by those of skill in the art, other algorithms may be applied to the amplitude independent error signals to define the error signals to be supplied as error signals to the taps 46 of the equalizer 45.

Referring to FIG. 10, in one embodiment, the arrangement of the registers 120, 121 . . . 136 provides adjustment of each of the plurality of taps 46 simultaneously. Simultaneous adjustment of all of the taps allows the equalizer to have consistency across all of the taps.

Figure 12:
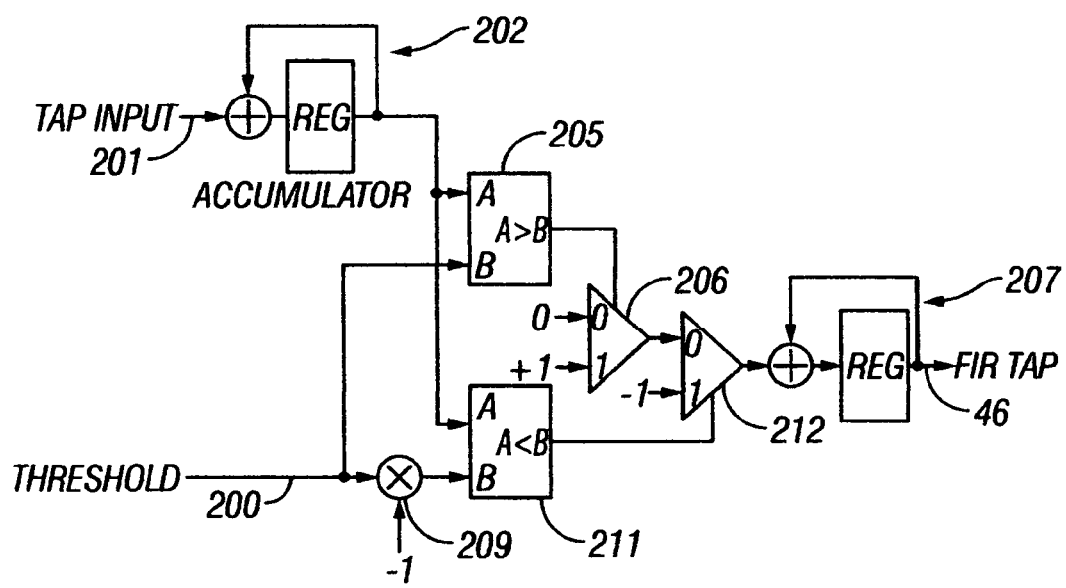
FIG. 12 is a block diagram of logic to damp the effect of the error signals to the equalizer of FIG. 2.
Figure 13:
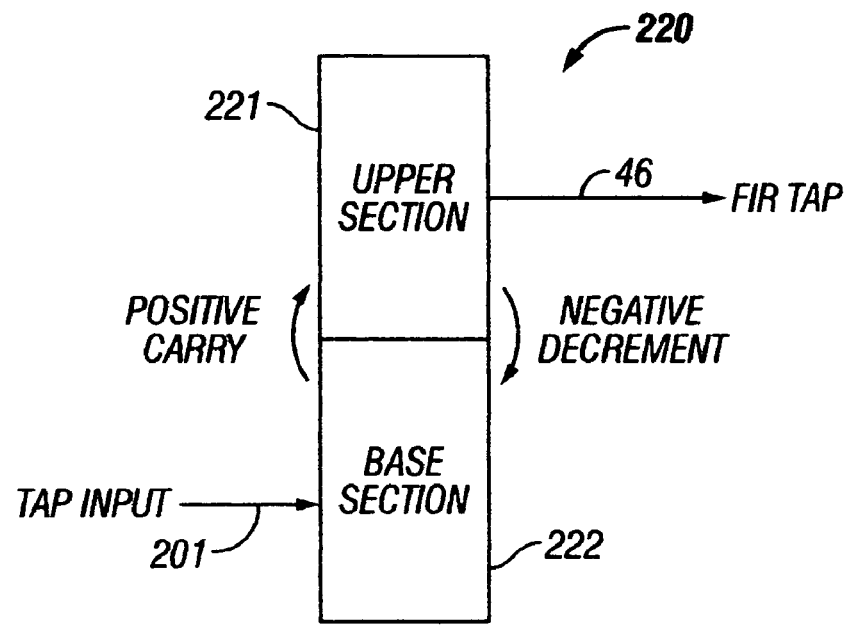
FIG. 13 is a block diagram of alternative logic to damp the effect of error signals to the equalizer of FIG. 2.

FIGS. 12 and 13 pertain to damping the effect of the amplitude independent error signals to the adjustable tap(s) 46 of the equalizer 45 of FIG. 2.

Referring to FIG. 12, the feedback logic 60 of FIG. 2 additionally comprises a damping apparatus which applies at least one threshold 200 to the amplitude independent error signals, for example as weighted. The damping apparatus of FIG. 12 is for a single one of the taps. Thus, separate thresholds may be applied to each of the taps. The tap input 201 is supplied to an accumulator 202, which may comprise an accumulator 180, 181 . . . 196 of FIG. 11, adapted to accumulate both in the positive direction and in the negative direction. Thus, in FIG. 12, positively signed weighted error signals are accumulated in the positive direction, and negatively signed weighted error signals are accumulated in the negative direction. When the accumulated total exceeds a positive value of the threshold 200, comparator 205 operates logic 206 to provide a "+1" signal to an accumulator 207. Thus, accumulator 202 accumulates the low order bits, which, when exceeded carries a signal to accumulator 207, which accumulates the high order bits for the taps 46 of the equalizer. As discussed above, the weighted amplitude independent error signals may be positive or negative. Thus, inverter 209 applies the same threshold 200 in the negative direction. When the accumulated negative total is greater than the negative value of the threshold 200, comparator 211 operates logic 212 to provide a "−1" signal to the accumulator 207. The accumulator 202 will accumulate the positive and negative weighted error signals, and only when the errors accumulate in one direction, will the threshold 200 be reached, thereby damping the tap input 201.

An alternative embodiment of the damping apparatus is illustrated in FIG. 13, where an accumulator 220, wherein overflow and/or underflow from the accumulator is supplied to the adjustable tap(s) of the equalizer. The accumulator 220 provides an output only from an upper section 221 to the FIR taps 46, while receiving the tap input 201 in a base section 222. The accumulator 220 is adapted to accumulate both in the positive direction and in the negative direction. Thus, positively signed weighted error signals are accumulated in the positive direction, and negatively signed weighted error signals are deducted from the accumulated total. When the accumulated total exceeds the highest value of the low level section 222, an overflow carry is made to the upper section 221. Conversely, when the accumulated total of the base section 222 goes below "0", an underflow causes a negative decrement of the upper section 221. Thus, the tap input 201 is damped by the interaction between the base section 222 and the upper section 221 of the accumulator 220. Those of skill in the art understand that additional damping arrangements may be provided.

As discussed above with respect to FIG. 2, the equalizer 45, filter 47, and sample interpolation logic 50 typically operate in the asynchronous domain, and the data detector 55, 56 typically operates in the synchronous domain, and the detector 63 also operates in the synchronous domain. In many systems, the asynchronous domain comprises a higher number of digital samples than the synchronous domain. Thus, the digital error signals are generated at a slower data rate than the equalizer 45 output signals. In this case, operation of the adaptive logic 60 may be well served to match the alignment of the synchronous error signals to the taps 46 of the equalizer.

Figure 14:
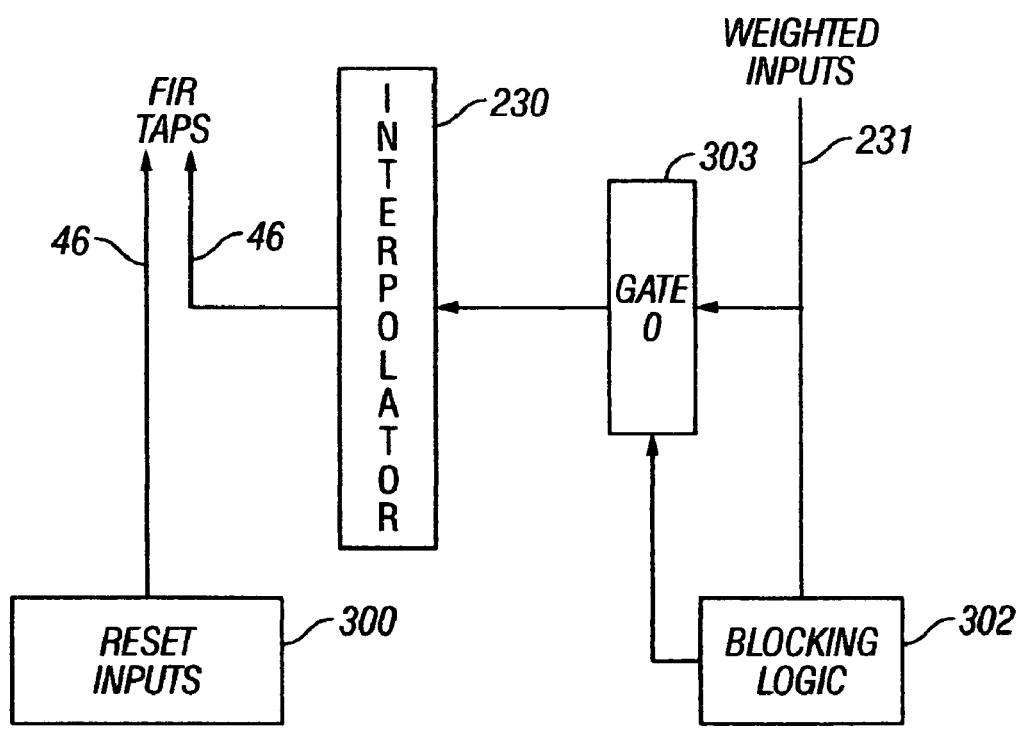
FIG. 14 is a block diagram of an interpolator as added to the dynamically adaptive equalizer logic of FIG. 2 for interpolating between the synchronous domain and the asynchronous domain.

In one embodiment, FIG. 14 illustrates an interpolator 230 that is added to the dynamically adaptive equalizer logic 60 of FIG. 2 for interpolating between the error signals of the synchronous domain and the taps of the equalizer which are in the asynchronous domain. The interpolator may be provided prior to the damping arrangement of FIGS. 12 or 13, receiving the weighted error signals 231, which are at a lesser data rate; interpolating the error signals to provide a number of tap signals that is greater than the number of error signals, and providing the interpolated tap signals to the FIR taps 46.

Figure 15:
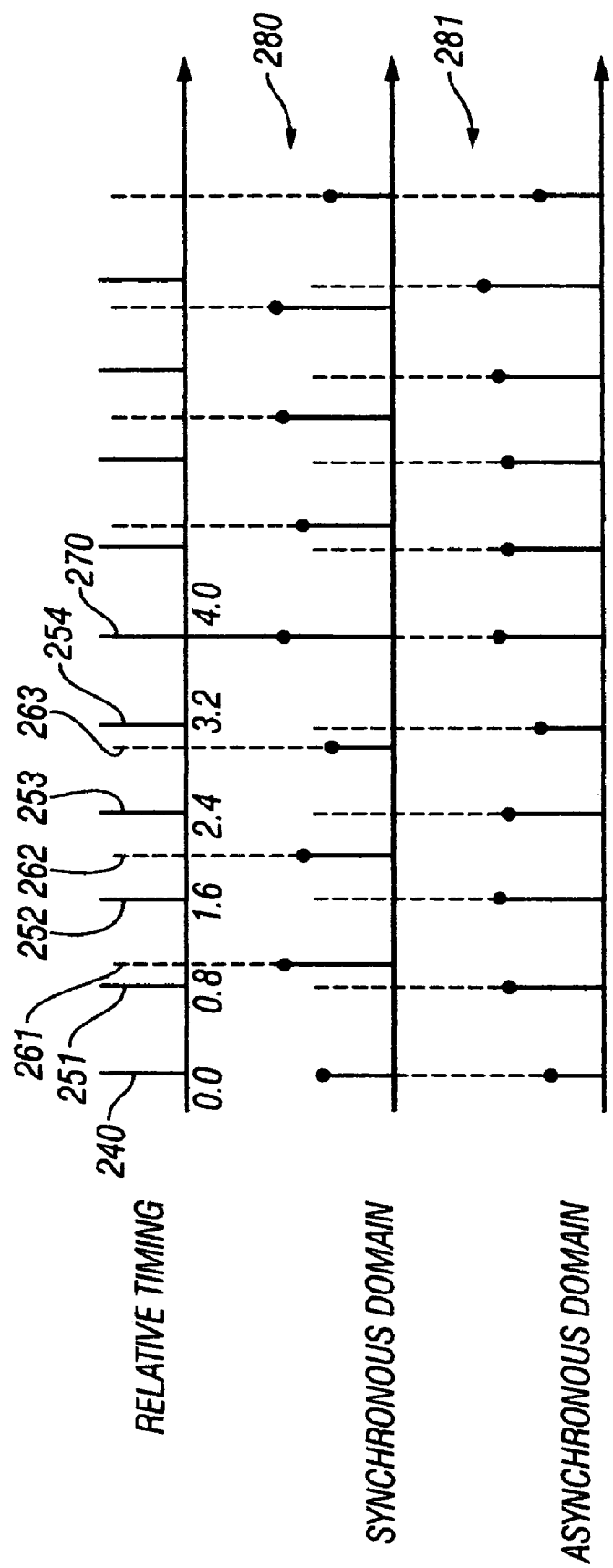
FIG. 15 is a diagrammatic illustration of interpolation of error signals by the interpolator of FIG. 14.

FIG. 15 illustrates the interpolation of error signals by the interpolator of FIG. 14. Timing element 240 represents an exemplary common timing of an asynchronous sample and an error signal. Timing element 251 represents the next timing of an asynchronous sample, and timing element 261 represents the next timing of a synchronous error signal; timing element 252 represents the timing of a third asynchronous sample, and timing element 262 represents the timing of a third synchronous error signal; timing element 253 represents the timing of the fourth asynchronous sample, and timing element 263 represents the timing of a fourth synchronous error signal; but the timing element 254 represents the timing of the fifth asynchronous sample, without a corresponding synchronous error symbol. Rather, timing element 270 represents the next common timing of an asynchronous sample and a synchronous error signal, this being the sixth asynchronous sample and the fifth synchronous error signal. The interpolator estimates, from every four synchronous error signals 280, five error signals 281 for the taps of the equalizer at the timing of the equalizer.

An alternative approach in accordance with the present invention is to hold selected taps of the equalizer constant, and signaling other selected taps with the error signals. Referring to FIG. 10, in one embodiment, the outputs of the feedback engine 65 are fewer in number than the number of equalizer taps 46, and only selected ones of the equalizer taps receive error signals from the feedback engine.

Figure 16:
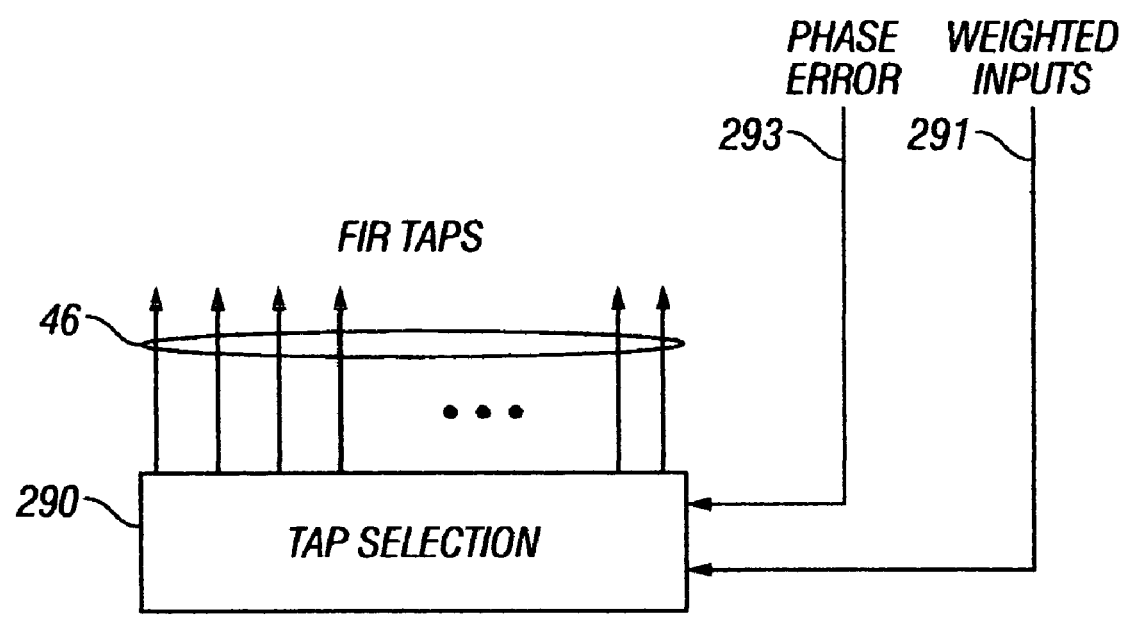
FIG. 16 is a block diagram of tap selection logic for signaling selected taps of the equalizer of FIG. 2.

Still alternatively, FIG. 16 illustrates an example of tap selection logic 290 for signaling selected taps 46 of the equalizer 45 of FIG. 2. Weighted error signals 291 are provided to the tap selection logic which selects ones of the taps 46 to receive the weighted error signals, leaving the remainder of the taps without error signals. For example, the tap selection logic may select a predetermined set of the taps 46 to receive the weighted error signals. As another example, the phase error from the phase-error generation logic 52 of FIG. 2 may be employed to select the taps that are most closely aligned with the weighted error signals as the recipients of those error signals.

Figure 17:
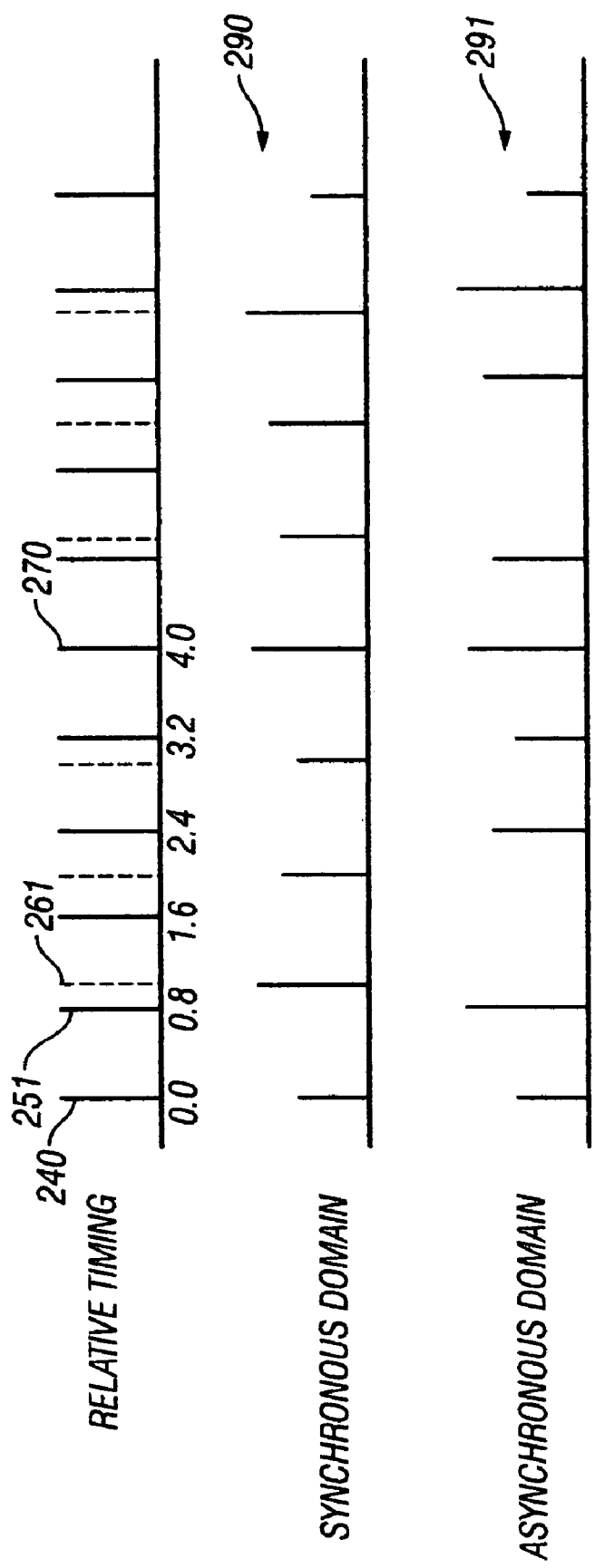
FIG. 17 is a diagrammatic illustration of tap selection by the logic of FIG. 16 to provide operation between the synchronous domain and the asynchronous domain.

FIG. 17 is a diagrammatic illustration of tap selection by the logic of FIG. 16 to provide operation between the synchronous domain and the asynchronous domain. In FIG. 17, the relative timing is represented the same as the relative timing of FIG. 15, where timing element 240 represents an exemplary common timing of an asynchronous sample and an error signal; timing element 251 represents the next timing of an asynchronous sample, and timing element 261 represents the next timing of a synchronous error signal; etc., and timing element 270 represents the next common timing of an asynchronous sample and a synchronous error signal, this being the sixth asynchronous sample and the fifth synchronous error signal.

Here, however, the tap selection provides, for every four synchronous error signals 290, four error signals 291 for the selected taps of the equalizer at the timing of the equalizer.

Referring to FIG. 14, in one embodiment, the adaptation logic additionally comprises logic 300 to reset the tap(s) 46 to nominal value, for example, at the beginning of a tape, or when wrap control system 27 of FIG. 1 electronically switches to another set of read and/or write heads, and/or seeks and moves the read and/or write heads 23 laterally of the magnetic tape, to position the heads at a desired wrap or wraps.

Still referring to FIG. 14, in one embodiment, the adaptation logic additionally comprises logic 302 to block feed back of the signaled sensed amplitude independent error signals to prevent adjustment of the tap(s) 46. Gate 303 normally allows the amplitude independent error signals, in the example shown as weighted error signals 231, but not necessary to this aspect of the invention, to be provided to the taps. Blocking logic 302 may, for example, respond to error signals that are unusually large for an extended period by providing a signal to the gate 303 to block any further errors from reaching the taps. Such error signals could result from a tape defect or scratch, or other issues as are understood by those of skill in the art.

Those of skill in the art will understand that changes may be made with respect to the components illustrated herein. Further, those of skill in the art will understand that differing specific component arrangements may be employed than those illustrated herein. For example, the detector 63 of FIG. 2 may comprise a detector that derives desired values from data detector 55, 56; compares the equalizer output signals to the desired values; and, if there is an offset, signals the fact of an error as an amplitude independent error signal.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. Logic for dynamically adapting an equalizer of a magnetic tape read channel, said equalizer having at least one adjustable tap, said equalizer equalizing input read signals, and providing output signals, comprising:
   a detector configured to sense said equalizer output signals that are offset from at least one desired value, and configured to signal said sensed offset equalizer output signals as amplitude independent error signals; and
   feedback logic configured to feed back said signaled sensed amplitude independent errors to at least one adjustable tap of said equalizer;
   wherein said detector is configured to sense the polarities of said offset equalizer output signals from said at least one desired value, and configured to signal said sensed offset equalizer output signals as amplitude independent error signals indicating said polarity of said offset;
   wherein said feedback logic additionally weights said amplitude independent error signals;
   wherein said equalizer is configured to operate in an asynchronous domain having a first sample rate, and said equalizer comprises a plurality of taps arranged in accordance with said sample rate;
   wherein said detector is configured to operate in a synchronous domain having a second sample rate less than said first sample rate, configured to sense said equalizer output signals that are offset from at least one synchronous desired value, and configured to signal said sensed offset equalizer output signals as amplitude independent error signals; and
   wherein said feedback logic is configured to adjust said feed back to said plurality of taps to match the alignment of said amplitude independent error signals to said taps of said equalizer.

2. The logic of claim 1, wherein said feedback is configured to adjust said feed back by signaling selected ones of said plurality of taps.

3. The logic of claim 1, wherein said feedback logic additionally comprises an interpolator to convert said amplitude errors to said alignment of said adjustable taps of said equalizer.

4. Logic for dynamically adapting an equalizer of a magnetic tape read channel, said equalizer having at least one adjustable tap, said equalizer equalizing input read signals, and providing output signals, comprising:
   a detector configured to sense said equalizer output signals that are offset from at least one desired value, and configured to signal said sensed offset equalizer output signals as amplitude independent error signals; and
   feedback logic configured to feed back said signaled sensed amplitude independent errors to at least one adjustable tap of said equalizer;
   wherein said detector is configured to sense the polarities of said offset equalizer output signals from said at least one desired value, and configured to signal said sensed offset equalizer output signals as amplitude independent error signals indicating said polarity of said offset;
   wherein said feedback logic additionally weights said amplitude independent error signals; and
   wherein said feedback logic additionally comprises a damping apparatus configured to dampen the effect of said amplitude independent error signals to said at least one adjustable tap of said equalizer.

5. The logic of claim 4, wherein said feedback logic damping apparatus comprises an accumulator, wherein overflow and/or underflow from said accumulator is supplied to said at least one adjustable tap of said equalizer.

6. The logic of claim 4, wherein said feedback logic damping apparatus comprises a threshold of said amplitude independent error signals.

7. An adaptive magnetic tape read channel equalizer comprising:
   an input configured to recieve input read signals;
   an equalizer configured to equalize said input said read input read signals from said input, and providing equalizer output signals, said equalizer having at least one adjustable tap; and
   adaptive logic configured to dynamically adjust said equalizer, comprising:
      a detector configured to sense said equalizer output signals that are offset from at least one desired value, and to signal said sensed offset equalizer output signals as amplitude independent error signals; and
      feedback logic configured to feed back said signaled sensed amplitude independent errors to at least one adjustable tap of said equalizer;
   wherein said detector of said adaptive logic is configured to sense the polarities of said offset equalizer output signals from said at least one desired value, and to signal said sensed offset equalizer output signals as amplitude independent error signals indicating said polarity of said offset;
   wherein said feedback logic of said adaptive logic additionally weights said amplitude independent error signals;
   wherein said equalizer is configured to operate in an asynchronous domain having a first sample rate, said equalizer comprises a plurality of taps arranged in accordance with said first sample rate;

wherein said detector is configured to operate in a synchronous domain having a second sample rate less than said first sample rate, configured to sense said equalizer output signals that are offset from at least one synchronous desired value, and configured to signal said sensed offset equalizer output signal as amplitude independent error signals; and wherein said feedback logic is configured to adjust said feed back to said plurality of taps to match the alignment of said amplitude independent error signals to said taps of said equalizer.

8. The magnetic tape read channel equalizer of claim 7, wherein said feedback logic is configured to adjust said feed back by signaling selected ones of said plurality of taps.

9. The magnetic tape read channel equalizer of claim 7, wherein said feedback logic comprises an interpolator to convert said amplitude independent errors to said alignment of said taps of said equalizer.

10. An adaptive magnetic tape read channel equalizer, comprising:

an input configured to recieve input read signals;

an equalizer configured to equalize said input said read input read signals from said input, and providing equalizer output signals, said equalizer having at least one adjustable tap; and adaptive logic configured to dynamically adjust said equalizer, comprising:

a detector configured to sense said equalizer output signals that are offset from at least one desired value, and to signal said sensed offset equalizer output signals as amplitude independent error signals; and feedback logic configured to feed back said signaled sensed amplitude independent errors to at least one adjustable tap of said equalizer;

wherein said detector of said adaptive logic is configured to sense the polarities of said offset equalizer output signals from said at least one desired value, and to signal said sensed offset equalizer output signals as amplitude independent error signals indicating said polarity of said offset;

wherein said feedback logic of said adaptive logic additionally weights said amplitude independent error signals; and wherein said feedback logic of said adaptive logic additionally comprises a damping apparatus configured to dampen the effect of said amplitude independent error signals to said at least one adjustable tap of said equalizer.

11. The magnetic tape read channel equalizer of claim 10, wherein said feedback logic damping apparatus comprises an accumulator, wherein overflow and/or underflow from said accumulator is supplied to said at least one adjustable tap of said equalizer.

12. The magnetic tape read channel equalizer of claim 10, wherein said feedback logic damping apparatus comprises at least one threshold of said amplitude independent error signals.

13. A magnetic tape drive, comprising:

at least one read head;

a drive system configured to move a magnetic tape with respect to said at least one read head such that said at least one read head may detect magnetic signals on said magnetic tape;

a read channel configured to digitally sample magnetic signals on said at least one read head, providing digital samples of said magnetic signals; and a read channel equalizer comprising:

an input for configured to recieve input read signals;

an equalizer configured to equalize said input read signals from said input, and providing equalizer output signals, said equalizer having at least one adjustable tap; and adaptive logic configured to dynamically adjust said equalizer, comprising:

a detector configured to sense said equalizer output signals that are offset from at least one desired value, and configured to signal said sensed offset equalizer output signals as amplitude independent error signals; and feedback logic configured to feed back said signaled sensed amplitude independent error signals to at least one adjustable tap of said equalizer;

wherein said detector of said adaptive logic is configured to sense the polarities of said offset equalizer output signals from said at least one desired value, and configured to signal said sensed offset equalizer output signals as amplitude independent error signals indicating said polarity of said offset;

wherein said feedback logic of said adaptive logic additionally weights said amplitude independent error signals;

wherein said equalizer is configured to operate in an asynchronous domain having a first sample rate, said equalizer comprises a plurality of taps arranged in accordance with said sample rate;

wherein said detector is configured to operate in a synchronous domain having a second sample rate less than said first sample rate configured to sense said equalizer output signals that are offset from at least one synchronous desired value, and configured to signal said sensed offset equalizer output signals as amplitude independent error signals; and wherein said feedback logic is configured to adjust said feed back to said plurality of taps to match the alignment of said amplitude independent error signals to said taps of said equalizer.

14. The magnetic tape drive of claim 13, wherein said feedback logic is configured to adjust said feedback by signaling selected ones of said plurality of taps.

15. The magnetic tape drive of claim 14, wherein said feedback logic comprises an interpolator to convert said amplitude independent errors to said alignment of said taps of said equalizer.

16. A magnetic tape drive, comprising:

at least one read head;

a drive system configured to move a magnetic tape with respect to said at least one read head such that said at least one read head may detect magnetic signals on said magnetic tape;

a read channel configured to digitally sample magnetic signals on said at least one read head, providing digital samples of said magnetic signals; and a read channel equalizer, comprising:

an input for configured to recieve input read signals;

an equalizer configured to equalize said input read signals from said input, and providing equalizer output signals, said equalizer having at least one adjustable tap; and adaptive logic configured to dynamically adjust said equalizer, comprising:

a detector configured to sense said equalizer output signals that are offset from at least one desired value, and configured to signal said sensed offset equalizer output signals as amplitude independent error signals; and feedback logic configured to feed back said signaled sensed amplitude independent errors to at least one adjustable tap of said equalizer;

wherein said detector of said adaptive logic is configured to sense the polarities of said offset equalizer output signals from said at least one desired value, and configured to signal said sensed offset equalizer output signals as amplitude independent error signals indicating said polarity of said offset;

wherein said feedback logic of said adaptive logic additionally weights said amplitude independent error signals;

wherein said feedback logic of said adaptive logic additionally comprises a damping apparatus configured to dampen the effect of said amplitude independent error signals to said at least one adjustable tap of said equalizer.

17. The magnetic tape drive of claim 16, wherein said feedback logic damping apparatus comprises an accumulator, wherein overflow and/or underflow from said accumulator is supplied to said at least one adjustable tap of said equalizer.

18. The magnetic tape drive of claim 16, wherein said feedback logic damping apparatus comprises at least one threshold of said amplitude independent error signals.

* * * * *

UNITED STATES PATENT AND TRADEMARK OFFICE
Certificate

Patent No. 7,271,971 B2                                                                           Patented: September 18, 2007

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Robert Allen Hutchins, Tucson, AZ (US); Glen Alan Jaquette, Tucson, AZ (US); Evangelos S. Eleftheriou, Zurich (CH); Sedat Oelcer, Kilchberg (CH); and William Hasenplaugh, Jamaica Plain, MA (US).

Signed and Sealed this Twenty-fifth Day of February 2014.

WAYNE YOUNG
*Supervisory Patent Examiner*
Art Unit 2688
Technology Center 2600